US012578492B2

(12) United States Patent
Al Kawai et al.

(10) Patent No.: US 12,578,492 B2
(45) Date of Patent: Mar. 17, 2026

(54) EVALUATION OF DENSITY AND SEISMIC IMPEDANCE VALUES OF GEOLOGIC LAYERS USING DRILL BIT SOUND DURING DRILLING

(71) Applicant: Saudi Arabian Oil Company, Dhahran (SA)

(72) Inventors: Wisam Al Kawai, Qatif (SA); Yunlai Yang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 347 days.

(21) Appl. No.: 17/894,428

(22) Filed: Aug. 24, 2022

(65) Prior Publication Data

US 2024/0069232 A1     Feb. 29, 2024

(51) Int. Cl.
*G01V 1/30* (2006.01)
*E21B 49/00* (2006.01)
*G01V 1/28* (2006.01)

(52) U.S. Cl.
CPC .............. *G01V 1/306* (2013.01); *E21B 49/00* (2013.01); *G01V 1/282* (2013.01); *E21B 2200/20* (2020.05)

(58) Field of Classification Search
None
See application file for complete search history.

(56) References Cited

U.S. PATENT DOCUMENTS

| | | |
|---|---|---|
| 4,173,898 A | 11/1979 | Forstermann et al. |
| 4,380,930 A | 4/1983 | Podhrasky et al. |
| 4,625,555 A | 12/1986 | Fujii |

(Continued)

FOREIGN PATENT DOCUMENTS

| | | |
|---|---|---|
| EP | 0117280 | 4/1990 |
| EP | 0294158 | 12/1993 |

(Continued)

OTHER PUBLICATIONS

Binzhong, Iain Mason, Stewart Greenhalgh, and Shankar Subramaniyan. "Seeing coal-seam top ahead of the drill bit through seismic-while-drilling." Geophysical Prospecting 63, No. 1 (2015): 166-182. (Year: 2015).*
U.S. Appl. No. 14/505,335, filed Oct. 3, 2014, Almarhoon et al.
U.S. Appl. No. 16/719,388, filed Dec. 18, 2019, Yang.
U.S. Appl. No. 17/643,330, filed Dec. 18, 2021, Al Kawai et al.
Alkawai et al., "Integrating statistical rock physics and pressure and thermal history modeling to map reservoir lithofacies in the deep-water Gulf of Mexico," Geophysics, 2018, 83(4): IM15-IM28, 14 pages.

(Continued)

*Primary Examiner* — Matthew G Marini
(74) *Attorney, Agent, or Firm* — Dinsmore & Shohl LLP

(57) ABSTRACT

Example computer-implemented methods, media, and systems for evaluating density and seismic impedance values of geologic layers using drill bit sound during drilling are disclosed. One example computer-implemented method includes receiving an acoustic signal associated with a sound produced by a well tool implemented to perform a well operation by contacting a portion of a subterranean zone, where the acoustic signal includes a source acoustic signal and a reflected acoustic signal, the reflected acoustic signal is produced in response to the source acoustic signal, and the sound is produced during a drilling operation. The acoustic signal is processed to determine the source acoustic signal and the reflected acoustic signal. A first signal is determined based on the source acoustic signal. A second signal is determined based on the reflected acoustic signal. Properties of the subterranean zone are determined based on a convolution of the first signal and the second signal.

17 Claims, 8 Drawing Sheets

(56) References Cited

U.S. PATENT DOCUMENTS

| | | | |
|---|---|---|---|
| 4,920,792 | A | 5/1990 | Difoggio |
| 4,958,125 | A | 9/1990 | Jardine et al. |
| 5,176,631 | A | 1/1993 | Koenig et al. |
| 5,178,005 | A | 1/1993 | Peterson |
| 5,243,855 | A | 9/1993 | Steiger et al. |
| 5,265,461 | A | 11/1993 | Steiger et al. |
| 5,673,697 | A | 10/1997 | Bryan et al. |
| 5,678,643 | A | 10/1997 | Robbins et al. |
| 5,691,475 | A | 11/1997 | Marsala |
| 5,753,812 | A | 5/1998 | Aron et al. |
| 5,868,030 | A | 2/1999 | Brumley et al. |
| 6,088,294 | A | 7/2000 | Leggett et al. |
| 6,163,257 | A | 12/2000 | Tracy |
| 6,382,332 | B1 | 5/2002 | Eaton |
| 6,420,869 | B1 | 7/2002 | Difoggio |
| 6,424,919 | B1 | 7/2002 | Moran et al. |
| 6,988,566 | B2 | 1/2006 | Lockerd, Sr. et al. |
| 6,995,360 | B2 | 2/2006 | Jones et al. |
| 7,173,239 | B2 | 2/2007 | Difoggio |
| 7,196,786 | B2 | 3/2007 | Difoggio |
| 7,289,909 | B2 | 10/2007 | Thomamnn et al. |
| 7,362,422 | B2 | 4/2008 | Difoggio et al. |
| 7,404,456 | B2 | 7/2008 | Weaver et al. |
| 7,705,982 | B2 | 4/2010 | Triana et al. |
| 7,823,451 | B2 | 11/2010 | Sarr |
| 7,940,302 | B2 | 5/2011 | Mehrotra et al. |
| 8,102,238 | B2 | 1/2012 | Golander et al. |
| 8,332,162 | B2 | 12/2012 | Abahri |
| 8,334,775 | B2 | 12/2012 | Tapp et al. |
| 8,750,513 | B2 | 6/2014 | Renkis |
| 9,074,467 | B2 | 7/2015 | Yang et al. |
| 9,103,192 | B2 | 8/2015 | Yang |
| 9,208,676 | B2 | 12/2015 | Fadell et al. |
| 9,234,794 | B2 | 1/2016 | Bond et al. |
| 9,234,974 | B2 | 1/2016 | Yang |
| 9,334,723 | B2 | 5/2016 | Yang |
| 9,447,681 | B2 | 9/2016 | Yang |
| 9,568,629 | B2 * | 2/2017 | Almarhoon .............. G01V 1/50 |
| 9,684,087 | B2 | 6/2017 | Yang |
| 9,696,444 | B2 | 7/2017 | Yang |
| 9,778,240 | B2 | 10/2017 | Koseoglu et al. |
| 9,797,822 | B2 | 10/2017 | Little, III et al. |
| 9,903,974 | B2 | 2/2018 | Yang |
| 10,120,090 | B2 | 11/2018 | Almarhoon et al. |
| 10,180,061 | B2 | 1/2019 | Yang |
| 10,519,769 | B2 | 12/2019 | Havens et al. |
| 10,551,516 | B2 | 2/2020 | Yang |
| 10,772,607 | B2 | 9/2020 | Guiles |
| 10,851,641 | B2 | 12/2020 | Yang et al. |
| 10,920,574 | B1 | 2/2021 | Yang et al. |
| 11,231,512 | B2 | 1/2022 | Yang |
| 2006/0107061 | A1 | 5/2006 | Holovacs |
| 2006/0136162 | A1 * | 6/2006 | Hamman .............. G01V 1/306 |
| | | | 702/104 |
| 2008/0068211 | A1 | 3/2008 | Aiello |
| 2010/0097205 | A1 | 4/2010 | Script |
| 2010/0207018 | A1 | 8/2010 | Djordjevic et al. |
| 2011/0266058 | A1 | 11/2011 | Kumar et al. |
| 2012/0307051 | A1 | 12/2012 | Welter |
| 2013/0075157 | A1 | 3/2013 | Yang et al. |
| 2013/0075160 | A1 | 3/2013 | Yang |
| 2013/0080060 | A1 | 3/2013 | Yang |
| 2013/0080065 | A1 | 3/2013 | Yang |
| 2014/0139681 | A1 | 5/2014 | Jones, Jr. et al. |
| 2015/0071035 | A1 | 3/2015 | Yang |
| 2015/0071036 | A1 | 3/2015 | Yang |
| 2015/0106031 | A1 | 4/2015 | Koseoglu et al. |
| 2015/0139273 | A1 | 5/2015 | Bagley et al. |
| 2015/0176407 | A1 | 6/2015 | Indo et al. |
| 2016/0187509 | A1 | 6/2016 | Boot et al. |
| 2017/0067337 | A1 | 3/2017 | Havens et al. |
| 2017/0153343 | A1 | 6/2017 | Almarhoon et al. |
| 2017/0276649 | A1 | 9/2017 | Schmitz et al. |
| 2018/0171772 | A1 | 6/2018 | Rodney |
| 2018/0284309 | A1 | 10/2018 | Hirabayashi et al. |
| 2018/0293309 | A1 | 10/2018 | Echols et al. |
| 2019/0072685 | A1 | 3/2019 | Yang |
| 2019/0094137 | A1 | 3/2019 | Little, III et al. |
| 2020/0056470 | A1 | 2/2020 | Ng et al. |
| 2020/0166662 | A1 | 5/2020 | Yang |
| 2021/0389492 | A1 | 12/2021 | Yang et al. |
| 2021/0396134 | A1 | 12/2021 | Al Kawai et al. |
| 2023/0175390 | A1 | 6/2023 | Al Kawai et al. |

FOREIGN PATENT DOCUMENTS

| | | |
|---|---|---|
| EP | 2930507 | 10/2015 |
| GB | 2217838 | 11/1989 |
| WO | WO 03027663 | 4/2003 |
| WO | WO 2011077271 | 6/2011 |
| WO | WO 2013049014 | 4/2013 |
| WO | WO 2013049111 | 4/2013 |
| WO | WO 2013049140 | 4/2013 |

OTHER PUBLICATIONS

Bayless and et al, "Acoustic Noise Reduction of Switched Reluctance Motor With Reduced RMS Current and Enhanced Efficiency," IEEE Transactions on Energy Conversion, 31(2), Jun. 2016, 10 pages.

Chen et al., "The Detection and Prediction for Oil Spill on the Sea Based on the Infrared Images," Infrared Physics and Technology, Jul. 2016, 77: 391-404, 14 pages.

Corelab.com [online], "Advanced Rock Properties: Acoustic Velocity System, AVMS-350HT," available on or before Jun. 18, 2017, [retrieved on May 22, 2018], retrieved from URL: <http://www.corelab.com/cli/advanced-rock-properties/acoustic-velocity-system>, 2 pages.

Gemmeke and Ruiter, "3D Ultrasound computer tomography for medical imaging," Nuclear Instruments and Methods in Physics Research A, vol. 580, Issue 2, Oct. 1, 2007, 9 pages.

Johnson, "Design and Testing of a Laboratory Ultrasonic Data Acquisition System for Tomography," thesis for degree of Master of Science in Mining and Minerals Engineering, Virginia Polytechnic Institute and State University, Dec. 2, 2004, 108 pages.

Macpherson et al., "Measurement of Mud Motor Rotation Rates using Drilling Dynamics," presented at the SPE/IADC Drilling Conference, Amsterdam, The Netherlands, Feb. 27-Mar. 1, 2001, 10 pages.

Masood et al., "A Critical Review on Estimation of Rock Properties Using Sound Levels Produced during Rotary Drilling"; International Journal of Earth Sciences and Engineering; Dec. 2012, 1809-1814, 6 pages.

Pabon et al., "Crude Oil Spectral Signatures and Empirical Models to Derive API Gravity," Fuel, 2019, 237: 1119-1131, 13 pages.

Rector III et al., "Radiation Pattern and Seismic Waves Generated by a Working Roller-Cone Drill Bit"; Geophysics; Society of Exploration Geophysicists; vol. 57, No. 10; Oct. 1992, 1319-1333, 15 pages.

Ruiter et al., "3D ultrasound computer tomography of the breast: A new era?" European Journal of Radiology 81S1, Sep. 2012, S133-S134, 11 pages.

Soma et al., "Trial of Coal Seam Imaging by Cross Correlation Analysis of Drilling Noise at Open-Pit Mine Based on Single Point 3C Downhole Observation" Proceedings of the 11th SEGJ International Symposium; Yokohama, Japan; Nov. 18-21, 2013, 302-306, 5 pages.

Zborovjan et al., "Acoustic Identification of Rocks during Drilling Process"; Acta Montanistica Slovaca; Dec. 1, 2003, 191-193, 3 pages.

* cited by examiner

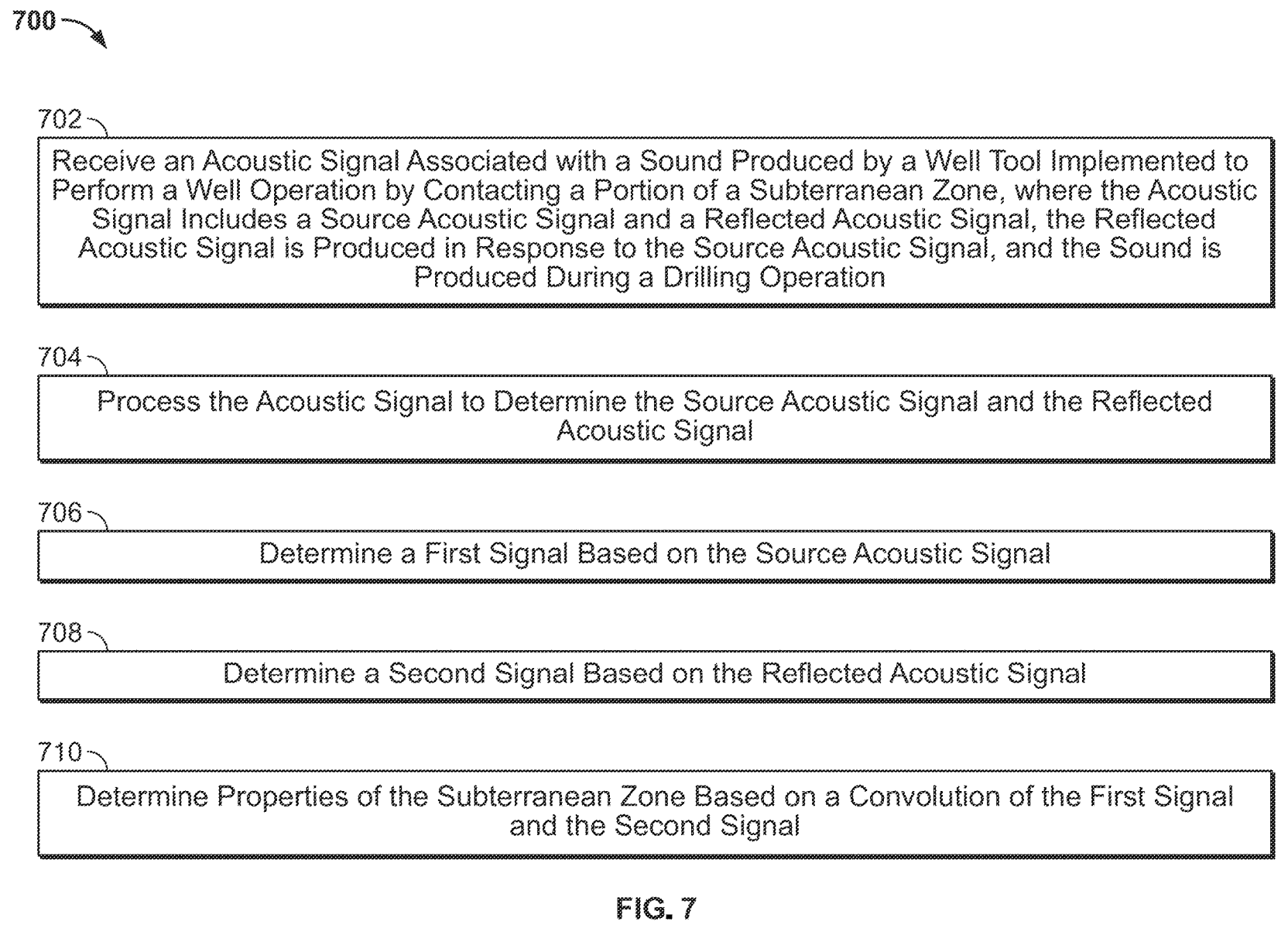

700

702 — Receive an Acoustic Signal Associated with a Sound Produced by a Well Tool Implemented to Perform a Well Operation by Contacting a Portion of a Subterranean Zone, where the Acoustic Signal Includes a Source Acoustic Signal and a Reflected Acoustic Signal, the Reflected Acoustic Signal is Produced in Response to the Source Acoustic Signal, and the Sound is Produced During a Drilling Operation 704 — Process the Acoustic Signal to Determine the Source Acoustic Signal and the Reflected Acoustic Signal 706 — Determine a First Signal Based on the Source Acoustic Signal 708 — Determine a Second Signal Based on the Reflected Acoustic Signal 710 — Determine Properties of the Subterranean Zone Based on a Convolution of the First Signal and the Second Signal

FIG. 7

EVALUATION OF DENSITY AND SEISMIC IMPEDANCE VALUES OF GEOLOGIC LAYERS USING DRILL BIT SOUND DURING DRILLING

TECHNICAL FIELD

The present disclosure relates to computer-implemented methods, media, and systems for evaluating density and seismic impedance values of geologic layers using drill bit sound during drilling.

BACKGROUND

Estimation of primary wave (P-wave) seismic impedance and density values of geologic layers at a borehole location in real-time while drilling can have applications in hydrocarbon exploration, such as interpreting lithology in a subsurface zone and tying well data to seismic data. A P-wave is a type of seismic wave in seismology. P-waves travel faster than other seismic waves. Methods such as logging while drilling (LWD) for predicting density and seismic impedance at the borehole location may incur high cost due to the sophisticated equipment that are sent down the borehole during drilling.

SUMMARY

The present disclosure involves computer-implemented methods, media, and systems for evaluating density and seismic impedance values of geologic layers using drill bit sound during drilling. One example computer-implemented method includes receiving an acoustic signal associated with a sound produced by a well tool implemented to perform a well operation by contacting a portion of a subterranean zone, where the acoustic signal includes a source acoustic signal and a reflected acoustic signal, the reflected acoustic signal is produced in response to the source acoustic signal, and the sound is produced during a drilling operation. The acoustic signal is processed to determine the source acoustic signal and the reflected acoustic signal. A first signal is determined based on the source acoustic signal. A second signal is determined based on the reflected acoustic signal. Properties of the subterranean zone are determined based on a convolution of the first signal and the second signal.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

FIG. 7 illustrates an example method for evaluating density and seismic impedance values of geologic layers using drill bit sound during drilling.

Like reference numbers and designations in the various drawings indicate like elements.

DETAILED DESCRIPTION

This disclosure describes technologies related to evaluation of density and seismic impedance values of geologic layers using drill bit sound during drilling. The cost of the evaluation can be relatively low due to the acoustic sensors used to collect sound waves. In some implementations, wellbore drilling can include rotating a drill bit within a subterranean formation. During wellbore drilling, acoustic sounds are generated by the drill bit engaging the subterranean formation. The generated sounds are termed as drilling acoustic signals hereafter. A part of the drilling acoustic signals is transmitted upward along the drill string and is termed "direct drilling acoustic signals." A part of the drilling acoustic signals is transmitted downwards into the subterranean formation. The subterranean formation includes layers of rock characterized by particular physical properties (e.g., porosity, water saturation, permeability, etc.) forming regions with different acoustic properties. At the incidence on a rock boundary, a part of the downward transmitted drilling acoustic signals are reflected and the rest propagates through the rock layer. Some of the reflected drilling acoustic signals collide with the drill bit and are transmitted upwards along the drill string. The part of the drilling acoustic signals that are transmitted by the drill string after the reflection on a rock boundary is termed "drilling acoustic signals" and includes both direct drilling acoustic signals and reflected drilling acoustic signals.

Figure 1:
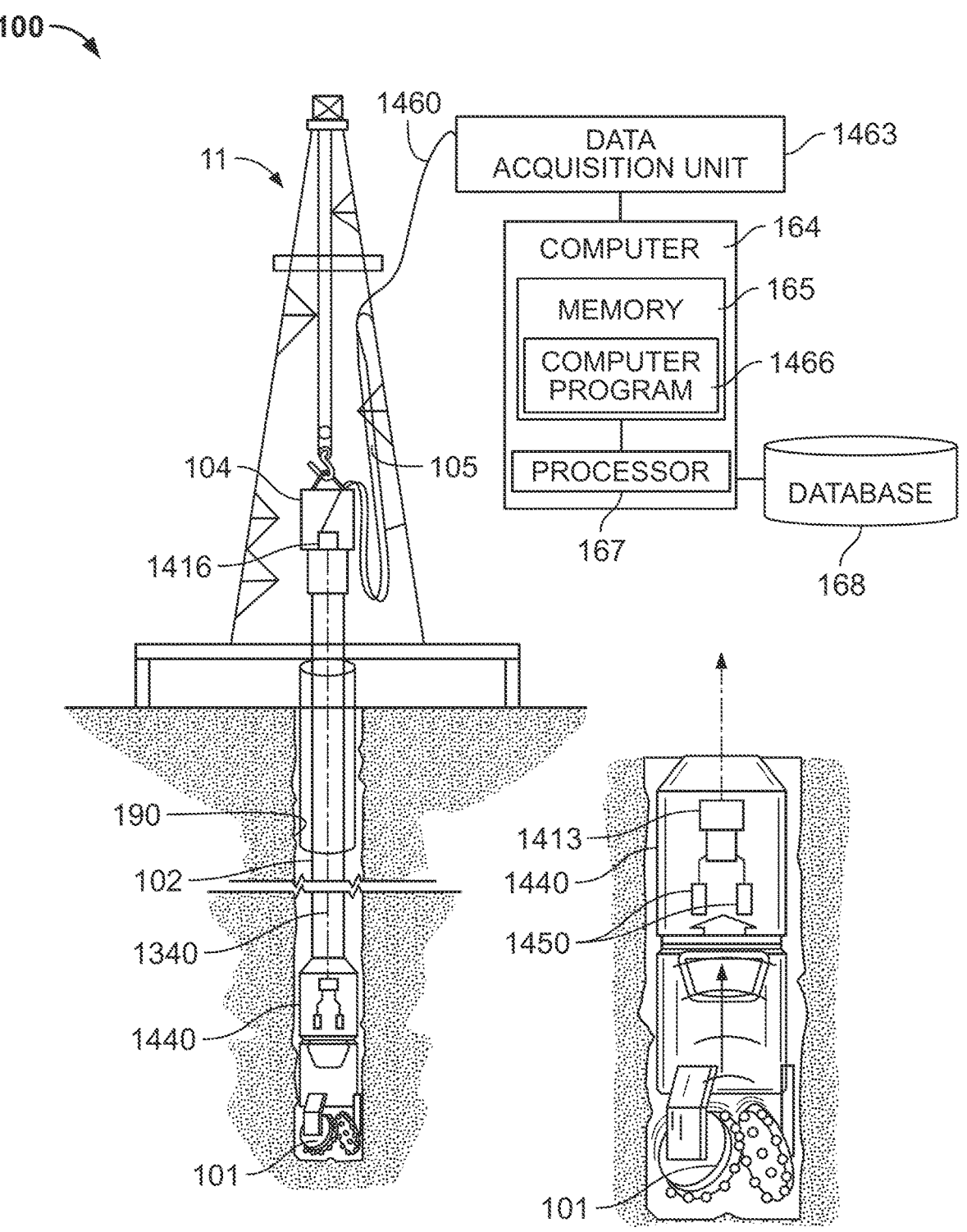
FIG. 1 illustrates an example system for drill bit sound recording and analysis.

FIG. 1 illustrates an example system 100 for drill bit sound recording and analysis. The example system 100 includes an acoustic signal recording system and an acquisition and transmission system attached to a top drive drilling rig 11. The top drive drilling rig 11 includes a top drive 104 that is the central component of the rig 11. The top drive 104 rotates a drive shaft. The rotation is transmitted to the drill string 102 and the drill bit 101 that drills the rock at the bottom of the borehole (well). A set of acoustic sensors 1450 are contained in a sensor subassembly 1440. The electric cable 1460 supplying electric power to the top drive 104 is within the service loops 105. The data interface 1413 and the transmitting interface 1416 are part of a borehole transmission system 1340. The computer 164 can include various components such as an electronic processor 167, memory 165 contained within, carried by, or otherwise operably coupled with the electronic processor 167, and a computer program 166 stored therein, which can adapt the computer 164 to perform program functions. U.S. patent application Ser. No. 14/505,335 filed on Oct. 2, 2014 and titled "Evaluation of rock boundaries and acoustic velocities using drill bit sound during vertical drilling," which is hereby incorporated in full by reference, provides further details about the example system 100 for drill bit sound recording and analysis.

Figure 2:
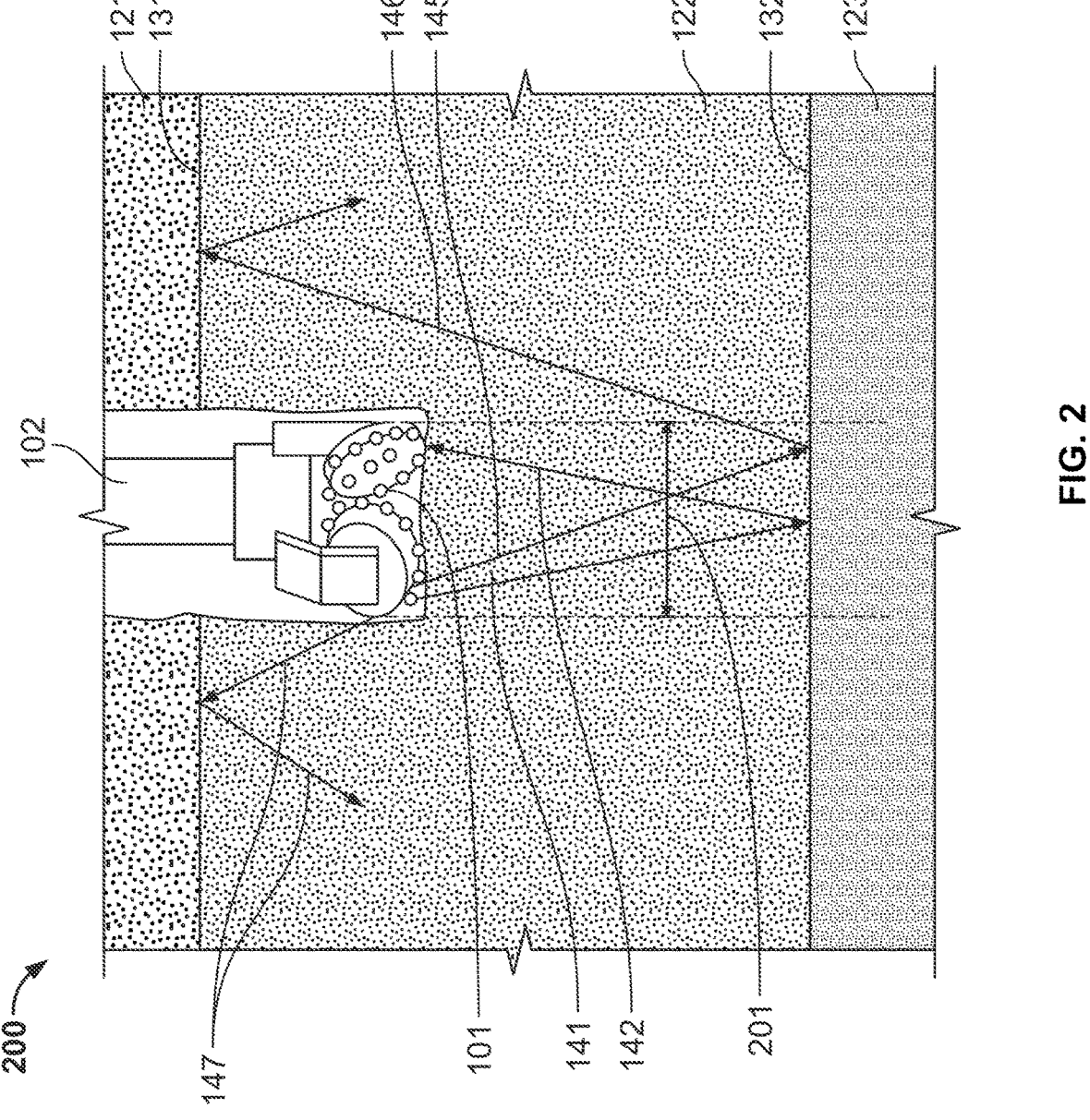
FIG. 2 illustrates an example portion of a system for measuring reflected drilling acoustic signals.

FIG. 2 illustrates an example portion 200 of a system for measuring reflected drilling acoustic signals. In some implementations, during vertical drilling, when the generated drilling acoustic signals are reflected by the rock boundaries, only the drilling acoustic signals with paths that are entirely within the projected area 201 of the drill bit 101 can be transmitted through the drill string 102 to be detected by the acoustic sensors. For example, the ray 142 which is the reflection of the ray 141 can reach to the drill bit 101 and thus can be transmitted along the drill string 102 to reach to the acoustic sensors (e.g., the acoustic sensors 1450 illustrated in FIG. 1). A substantial part of the reflected drilling acoustic signals with paths that are not entirely within the detection area 201 do not reach the drill bit 101 or the drill string and are not transmitted by the drill string 102 towards the sensors. For example, the path of the ray 146, which is the reflection of the ray 145, is partly outside the detection area 201, is transmitted away from the borehole and consequently, the ray 146 does not reach to the acoustic sensors 1450 in FIG. 1. As another example, a ray 147 of drill bit sound, which transmits upwards at an angle, away from the vertical axis, is transmitted away from the drill string 102, and is not detected by the acoustic sensors 1450 in FIG. 1. Based on the propagation trajectories of the drilling acoustic signals, during vertical drilling, the acoustic signals received by the acoustic sensors are the direct drilling acoustic signals, and the reflected drilling acoustic signals detected by the drill bit, and noises. The aforementioned U.S. patent application Ser. No. 14/505,335 provides further details about the example portion 200 of the system for measuring reflected drilling acoustic signals.

Figure 3:
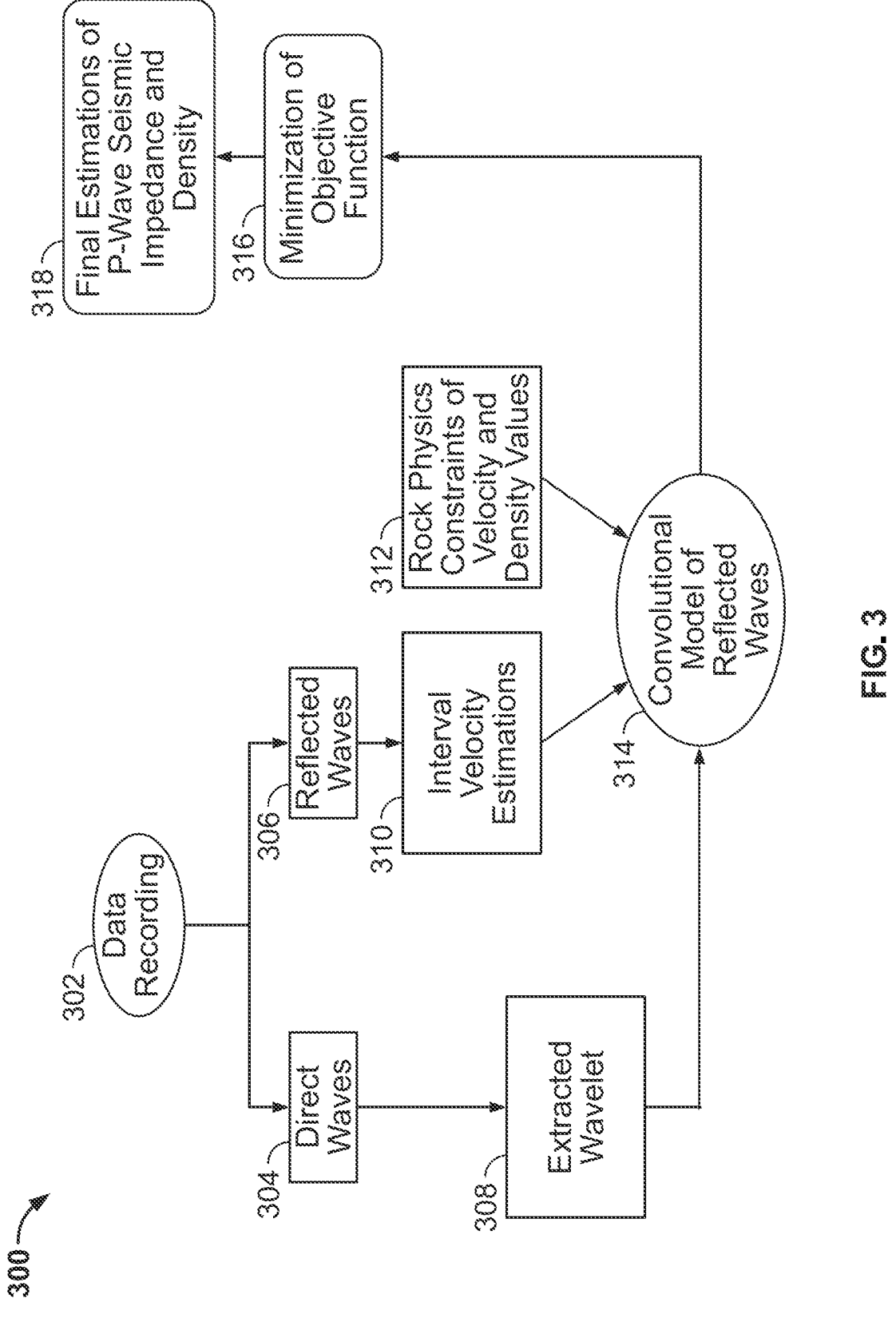
FIG. 3 illustrates an example workflow for evaluating density and seismic impedance values of geologic layers using drill bit sound during drilling.

FIG. 3 illustrates an example workflow 300 for evaluating density and seismic impedance values of geologic layers using drill bit sound during drilling.

At 302, a system, for example, system 100 in FIG. 1, can be used to record data of sound waves produced by a drill bit and transmitted through a drill string such as the drill string 102 illustrated in FIG. 2, where the sound waves include both direct drilling acoustic signals, for example, direct waves 304 in FIG. 3, and reflected drilling acoustic signals, for example, reflected waves 306 in FIG. 3. The reflected drilling acoustic signals are reflected at interfaces between geologic layers. In some implementations, the drill bit is used as a source for seismic waves, and the data is recorded for about 1 minute when the drilling is paused for adding a new drill pipe about every 30 meters. Seismic reflections corresponding to relatively wide angle of incidence and multiples are not transmitted through the drill string 102, as shown in FIG. 2. The aforementioned U.S. patent application Ser. No. 14/505,335 provides further details about data recording at 302.

After data is recorded at 302, the techniques disclosed in the aforementioned U.S. patent application Ser. No. 14/505, 335 can be applied to separate the direct waves 304 from the reflected waves 306.

Using the techniques disclosed in the aforementioned U.S. patent application Ser. No. 14/505,335, the data of reflected waves 306 can be analyzed to determine geologic boundaries and estimate interval velocity values 310 at different geologic layers.

The data of direct waves 304 represents the source seismic waves that transmit upward along the drill string 102 in FIG. 2. The direct waves 304 can be used to extract a wavelet 308, w(t), using a fast Fourier transform (FFT).

The reflected waves data 306 can be bulk shifted to be in the subsurface travel time domain t as follows.

$$t = t_r - t_a \tag{1}$$

where $t_r$ is the arrival time of reflected waves 306 and $t_a$ is the arrival time of last recorded direct wave in direct waves 304.

Next, the amplitude of the signal of reflected waves 306 can be expressed in the subsurface travel time as a function s(t) and similarly the estimations of interval velocities of geologic layers can be expressed as a velocity function of subsurface travel time v(t).

At 312, rock physics constraints of seismic velocity and density values at each geologic layer are determined.

In some implementations, rock physics models can relate elastic properties such as seismic velocity and elastic moduli to rock properties such as lithology, saturating pore fluid and porosity in order to characterize rock properties from seismic signatures. Elastic moduli can represent a measure of rigidity or stiffness of a material. Rock physics models can be calibrated to well log data such that the rock physics models capture the trend of the data as shown in an example relationship 400 between P-wave velocity and porosity in FIG. 4. A rock physics model can be expressed as a relationship between seismic velocity and bulk density such as the example relationship 500 illustrated in FIG. 5. A rock physics model for a particular geologic layer can be calibrated to the data of offset wells to transform the interval velocity value of a geologic layer i at a well being drilled, $v_i$, into a bulk density value $\rho_i$ as follows.

$$r(v_i) = \rho_i \tag{2}$$

such that $r(v_i)$ is the rock physics model relating seismic velocity to bulk density.

In some implementations, density value from a single rock physics model at a geologic layer may not yield the value of P-wave seismic impedance that can produce a forward model of reflected waves matching the gathered reflected waves. A geologic layer can have a complex degree of heterogeneity such that a series of rock physics models representing different possible lithologies that may be encountered in the geologic layer may be considered to find optimum P-wave seismic impedance value of the geologic layer.

Figure 4:
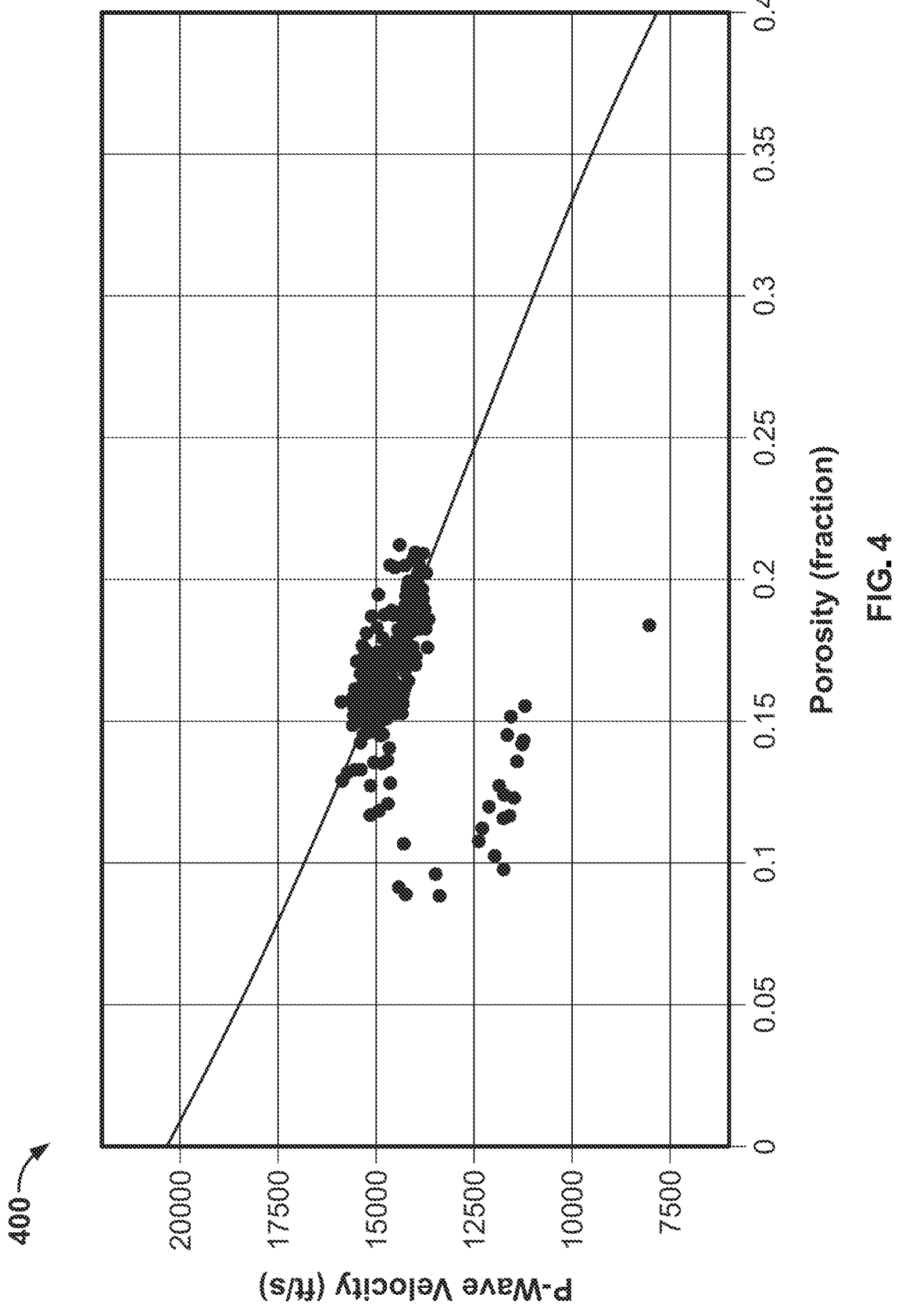
FIG. 4 illustrates an example relationship between P-wave velocity and porosity of a rock physics model.
Figure 5:
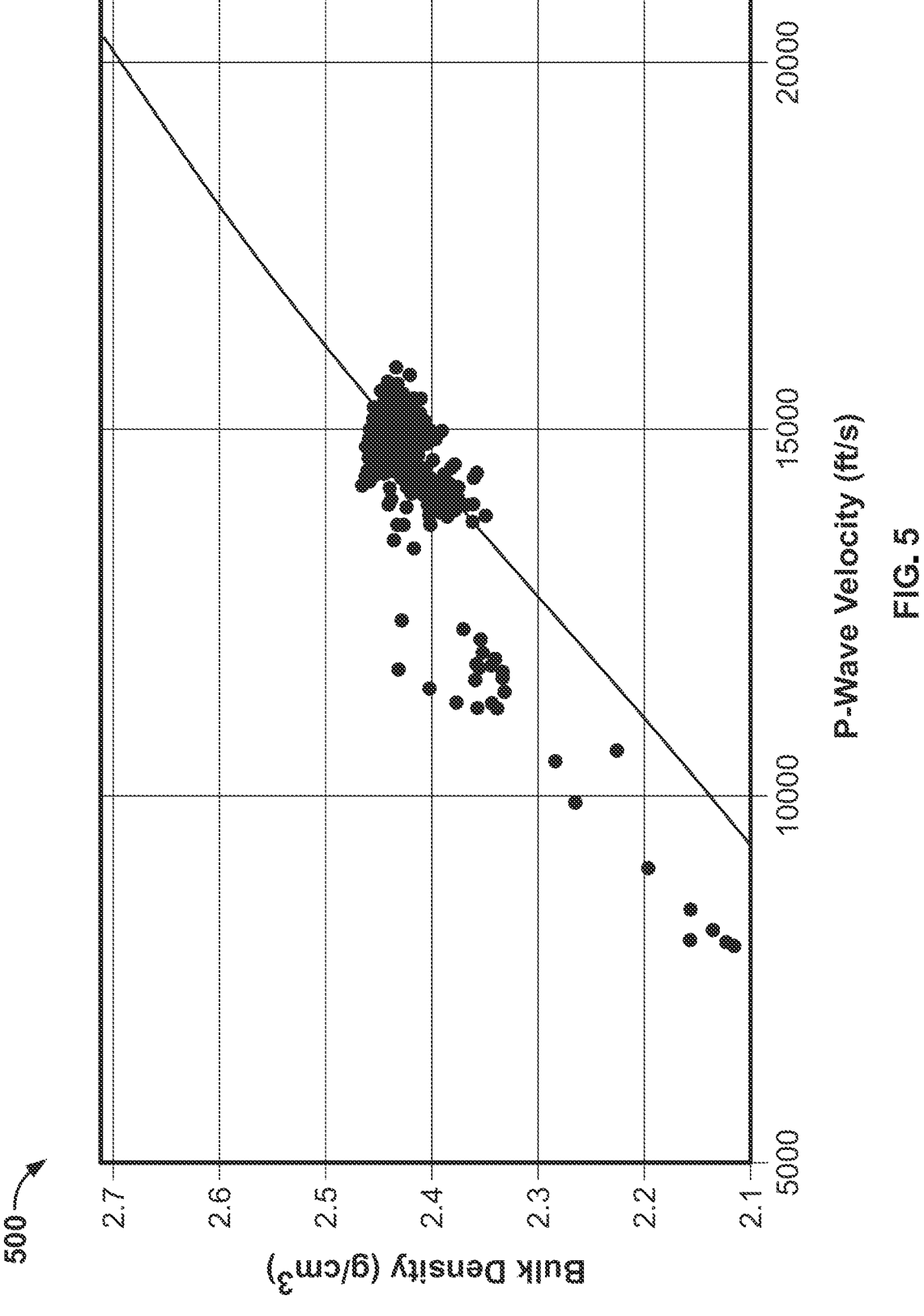
FIG. 5 illustrates an example relationship between seismic velocity and bulk density of a rock physics model.
Figure 6:
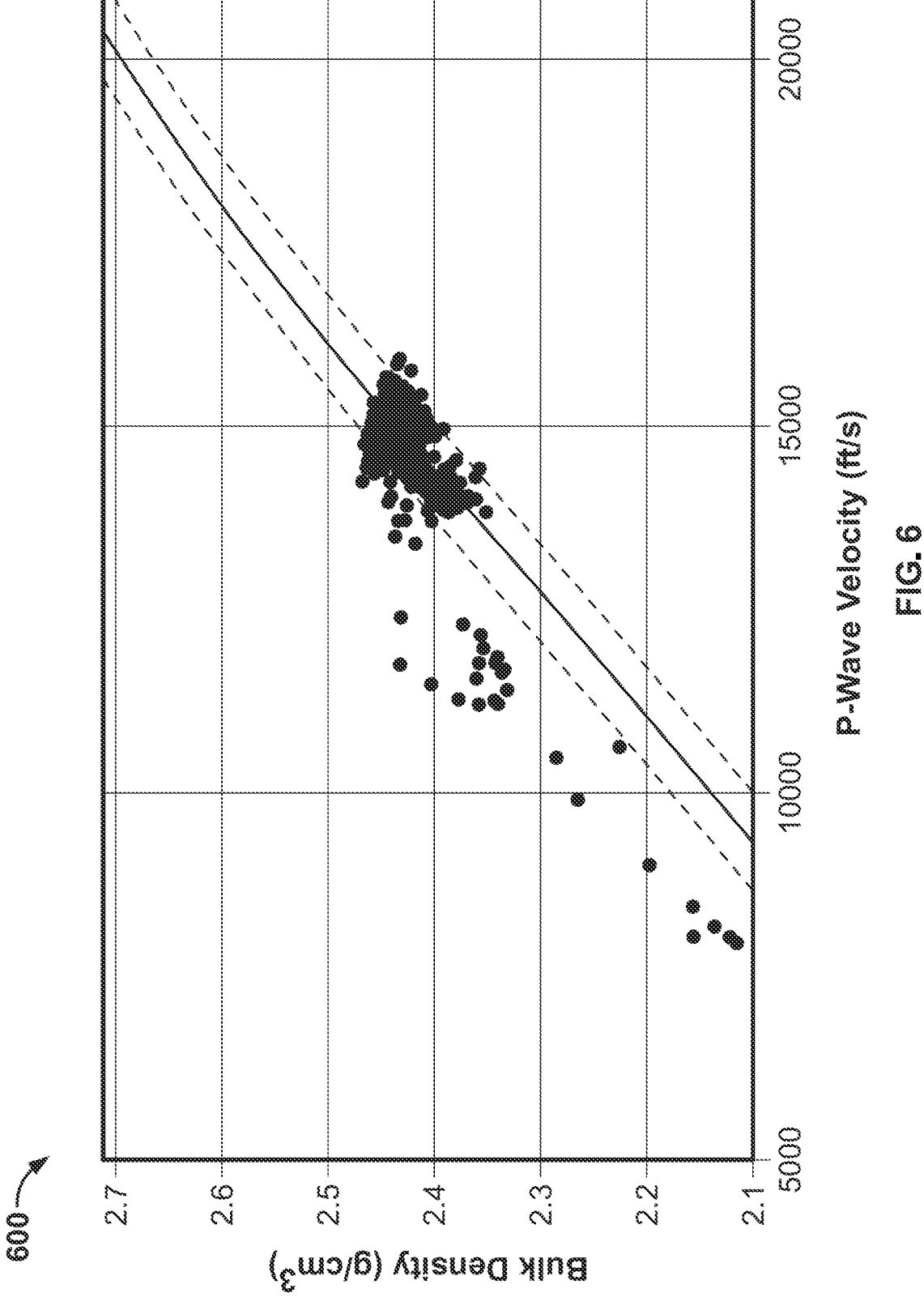
FIG. 6 illustrates an example of bounds of a confidence interval of a rock physics model.

In some implementations, a rock physic model represents a mean trend of well data and there is some uncertainty of the well data that is not captured by the rock physics model, as can be seen in FIG. 4 and FIG. 5. Such uncertainty can be important because interval velocities can differ in their values from seismic velocities of sonic logs due to the dispersion effect. Bootstrapping techniques can be applied to rock physics model to derive bounds of a confidence interval of the rock physics model that capture certain percentage of the data points from wells as illustrated in an example 600 of bounds of a confidence interval in FIG. 6. Therefore, a set of rock physics models, $l(v_i)$, corresponding to a geologic layer i, can represent models of varying lithologies as well as bounds of certain confidence interval of a model of a particular lithology. If a geologic layer i is associated with n number of rock physics models, then:

$$l(v_i) = \{r_1(v_i), r_2(v_i), \ldots, r_n(v_i)\} \tag{3}$$

where $l(v_i)$ can represent a rock physics constraint on the density value of a geologic layer i provided that the interval velocity value of the geologic layer i is known.

In some implementations, there can be a library of rock physics models of various observed lithologies in different geologic layers along with confidence intervals of these models. To solve for an optimum density transform $r_o(v_i)$ in a geologic layer such that $r_o(v_i) \in l(v_i)$, the value of reflection coefficient $R_i$ can be calculated using the equation below:

$$R_i = \frac{v_{i+1}\rho_{i+1} - v_i\rho_i}{v_{i+1}\rho_{i+1} + v_i\rho_i} \qquad (4)$$

where $v_{i+1}\rho_{i+1}$ represents multiplication of velocity and density values of the geologic layer above a boundary and $v_i\rho_i$ represents those corresponding to the geologic layer below the boundary. The multiplication of interval velocity and density value of a particular geologic layer i results in P-wave seismic impedance $PI_i$. Based on Equation (2), Equation (4) can be re-written in terms of rock physics transforms:

$$R_i = \frac{v_{i+1}r_{i+1}(v_{i+1}) - v_i r_i(v_i)}{v_{i+1}r_{i+1}(v_{i+1}) + v_i r_i(v_i)} \qquad (5)$$

The aggregation of values of reflection coefficients of geologic boundaries along with subsurface travel time to each boundary from the drill bit can represent a reflectivity function R(t). Using the techniques disclosed in the aforementioned U.S. patent application Ser. No. 14/505,335, the subsurface travel time to each boundary from the drill bit can be estimated.

In some implementations, a synthetic model m(t) of the amplitude of reflected waves can be generated based on one dimensional convolution:

$$m(t) = w(t) * R(t) \qquad (6)$$

where the synthetic model m(t) is generated as an integral of the product of wavelet w(t) generated at 308 of FIG. 3 and the reflectivity function R(t), after either w(t) or R(t) is reversed and shifted. The integral is evaluated for all values of shift, producing the convolution result m(t).

An objective function, $f(t)$, can be calculated based on comparing the traces of the synthetic model, m(t), to the gathered amplitude traces of reflected waves, s(t), across all the geologic boundaries.

In some implementations, the objective function can be expressed as a least square approximation of the misfit of amplitude:

$$f(t) = \sum_{i=1}^{m} |s_i(t) - m_i(t)|^2 \qquad (7)$$

where m in the summation represents the number of traces of reflected waves observed in a window over which the objective function $f(t)$ is being applied.

The final solution for density at 318 of FIG. 3 is then the density value of each geologic layer derived from the optimum rock physics transform at each geologic layer such that the objective function, $f(t)$, is minimized at 316 of FIG. 3.

In some implementations, the final solution of P-wave seismic impedance of each geologic layer at 318 of FIG. 3 is obtained by multiplying the density value of each geologic layer in the final solution by the interval velocity value of each geologic layer from 310 of FIG. 3.

FIG. 7 illustrates an example method 700 for evaluating density and seismic impedance values of geologic layers using drill bit sound during drilling. For convenience, the method 700 will be described as being performed by a system of one or more computers, located in one or more locations, and programmed appropriately in accordance with this specification.

At 702, a computer system receives an acoustic signal associated with a sound produced by a well tool implemented to perform a well operation by contacting a portion of a subterranean zone, where the acoustic signal includes a source acoustic signal and a reflected acoustic signal, the reflected acoustic signal is produced in response to the source acoustic signal, and the sound is produced during a drilling operation.

At 704, the computer system processes the acoustic signal to determine the source acoustic signal and the reflected acoustic signal.

At 706, the computer system determines a first signal based on the source acoustic signal.

At 708, the computer system determines a second signal based on the reflected acoustic signal.

At 710, the computer system determines properties of the subterranean zone based on a convolution of the first signal and the second signal.

Figure 8:
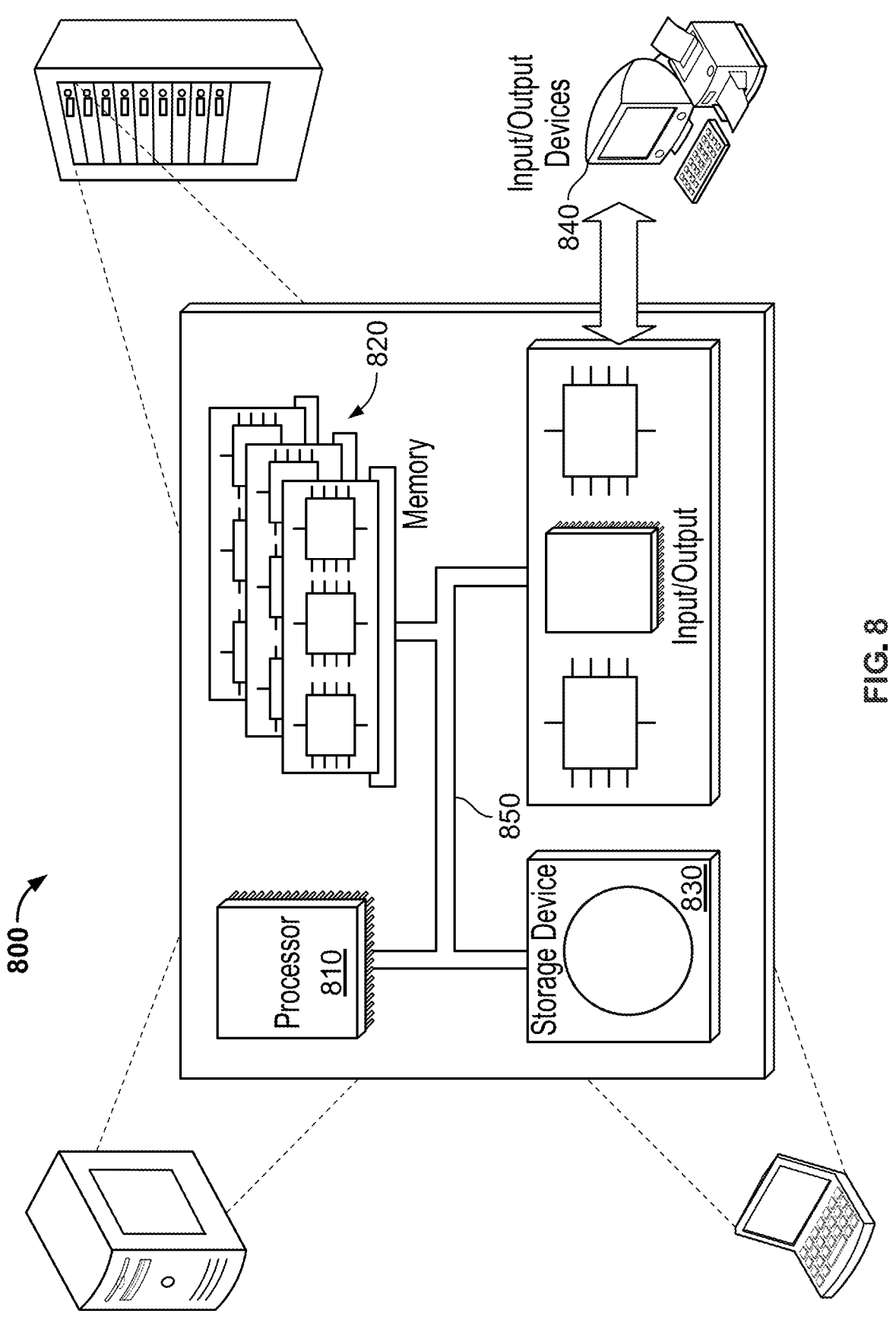
FIG. 8 is a schematic illustration of example computer systems that can be used to execute implementations of the present disclosure.

FIG. 8 illustrates a schematic diagram of an example computing system 800. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, and 840 are interconnected using a system bus 850. The processor 810 is capable of processing instructions for execution within the system 800. In some implementations, the processor 810 is a single-threaded processor. The processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. The memory 820 is a volatile memory unit. The memory 820 is a non-volatile memory unit. The storage device 830 is capable of providing mass storage for the system 800. The storage device 830 is a computer-readable medium. The storage device 830 may be a floppy disk device, a hard disk device, an optical disk device, or a tape device. The input/output device 840 provides input/output operations for the system 800. The input/output device 840 includes a keyboard and/or pointing device. The input/output device 840 includes a display unit for displaying graphical user interfaces.

Certain aspects of the subject matter described here can be implemented as a method. An acoustic signal is received, where the acoustic signal is associated with a sound produced by a well tool implemented to perform a well operation by contacting a portion of a subterranean zone, the acoustic signal includes a source acoustic signal and a reflected acoustic signal, the reflected acoustic signal is produced in response to the source acoustic signal, and the sound is produced during a drilling operation. The acoustic signal is processed to determine the source acoustic signal and the reflected acoustic signal. A first signal is determined based on the source acoustic signal. A second signal is determined based on the reflected acoustic signal. Properties of the subterranean zone are determined based on a convolution of the first signal and the second signal.

An aspect taken alone or combinable with any other aspect includes the following features. The determined properties of the subterranean zone for characterization of sub-surface properties of lithology of the subterranean zone are provided during the drilling operation.

An aspect taken alone or combinable with any other aspect includes the following features. The properties of the subterranean zone include primary wave seismic impedance and density of each of one or more geologic layers in the subterranean zone.

An aspect taken alone or combinable with any other aspect includes the following features. Determining the second signal based on the reflected acoustic signal includes determining the second signal based on the reflected acoustic signal and a rock physics model that models a relationship between interval velocity and density of each of one or more geologic layers in the subterranean zone.

An aspect taken alone or combinable with any other aspect includes the following features. Determining the properties of the subterranean zone includes determining the properties of the subterranean zone based on the convolution of the first signal and the second signal and a minimization of a function.

An aspect taken alone or combinable with any other aspect includes the following features. The convolution of the first signal and the second signal is a one dimensional convolution of the first signal and the second signal.

An aspect taken alone or combinable with any other aspect includes the following features. The rock physics model is determined by a respective interval velocity of each of the one or more geologic layers in the subterranean zone.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a computer-implemented system that includes one or more processors including a hardware-based processor, and a memory storage including a non-transitory computer-readable medium storing instructions which, when executed by the one or more processors performs operations including the methods described here.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method, comprising:
   receiving an acoustic signal associated with a sound produced by a well tool implemented to perform a well operation by contacting a portion of a subterranean zone, wherein the acoustic signal comprises a source acoustic signal and a reflected acoustic signal, the source acoustic signal is received during a drilling operation, the reflected acoustic signal is produced in response to the source acoustic signal and is received during a pause of the drilling operation, and the sound is produced during the drilling operation;
   processing the acoustic signal to determine the source acoustic signal and the reflected acoustic signal;

determining a first signal based on the source acoustic signal;
   determining, for each of a plurality of candidate sets of rock physics models, a second signal based on the reflected acoustic signal and a respective candidate set, wherein each of the rock physics models from the respective candidate set is selected from a library of rock physics models and corresponds to a respective geologic layer, the rock physics model modeling a relationship between interval velocity and density of each of one or more geologic layers in the subterranean zone;
   generating, for each of the plurality of candidate sets of rock physics models, a respective synthetic signal based on a convolution of the first signal and the respective second signal;
   computing, for each of the plurality of candidate sets of rock physics models, an objective misfit function based on a comparison of the respective synthetic signal and the reflected acoustic signal;
   determining properties of the subterranean zone, the determined properties corresponding to an identified candidate set of rock physics models that minimizes the objective misfit function, wherein the properties of the subterranean zone comprise density of each of the one or more geologic layers in the subterranean zone; and
   performing lithology interpretation operations of the subterranean zone using the determined properties of the subterranean zone.

2. The computer-implemented method of claim 1, further comprising:
   providing, during the drilling operation, the determined properties of the subterranean zone for characterization of subsurface properties of lithology of the subterranean zone.

3. The computer-implemented method of claim 1, wherein the properties of the subterranean zone comprise primary wave seismic impedance of each of the one or more geologic layers in the subterranean zone.

4. The computer-implemented method of claim 1, wherein determining the properties of the subterranean zone comprises determining the properties of the subterranean zone based on the convolution of the first signal and the second signal and a minimization of a function.

5. The computer-implemented method of claim 1, wherein the convolution of the first signal and the second signal is a one dimensional convolution of the first signal and the second signal.

6. The computer-implemented method of claim 1, wherein each of the rock physics models is determined by a respective interval velocity of each of the one or more geologic layers in the subterranean zone.

7. A non-transitory, computer-readable medium storing one or more instructions executable by a computer system to perform operations comprising:
   receiving an acoustic signal associated with a sound produced by a well tool implemented to perform a well operation by contacting a portion of a subterranean zone, wherein the acoustic signal comprises a source acoustic signal and a reflected acoustic signal, the source acoustic signal is received during a drilling operation, the reflected acoustic signal is produced in response to the source acoustic signal and is received during a pause of the drilling operation, and the sound is produced during the drilling operation;
   processing the acoustic signal to determine the source acoustic signal and the reflected acoustic signal;

determining a first signal based on the source acoustic signal;

determining, for each of a plurality of candidate sets of rock physics models, a second signal based on the reflected acoustic signal and a respective candidate set, wherein each of the rock physics models from the respective candidate set is selected from a library of rock physics models and corresponds to a respective geologic layer, the rock physics model modeling a relationship between interval velocity and density of each of one or more geologic layers in the subterranean zone;

generating, for each of the plurality of candidate sets of rock physics models, a respective synthetic signal based on a convolution of the first signal and the respective second signal;

computing, for each of the plurality of candidate sets of rock physics models, an objective misfit function based on a comparison of the respective synthetic signal and the reflected acoustic signal;

determining properties of the subterranean zone, the determined properties corresponding to an identified candidate set of rock physics models that minimizes the objective misfit function, wherein the properties of the subterranean zone comprise density of each of the one or more geologic layers in the subterranean zone; and performing lithology interpretation operations of the subterranean zone using the determined properties of the subterranean zone.

8. The non-transitory, computer-readable medium of claim 7, wherein the operations further comprise:

providing, during the drilling operation, the determined properties of the subterranean zone for characterization of subsurface properties of lithology of the subterranean zone.

9. The non-transitory, computer-readable medium of claim 7, wherein the properties of the subterranean zone comprise primary wave seismic impedance of each of the one or more geologic layers in the subterranean zone.

10. The non-transitory, computer-readable medium of claim 7, wherein determining the properties of the subterranean zone comprises determining the properties of the subterranean zone based on the convolution of the first signal and the second signal and a minimization of a function.

11. The non-transitory, computer-readable medium of claim 7, wherein the convolution of the first signal and the second signal is a one dimensional convolution of the first signal and the second signal.

12. The non-transitory, computer-readable medium of claim 7, wherein each of the rock physics models is determined by a respective interval velocity of each of the one or more geologic layers in the subterranean zone.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving an acoustic signal associated with a sound produced by a well tool implemented to perform a well operation by contacting a portion of a subterranean zone, wherein the acoustic signal comprises a source acoustic signal and a reflected acoustic signal, the source acoustic signal is received during a drilling operation, the reflected acoustic signal is produced in response to the source acoustic signal and is received during a pause of the drilling operation, and the sound is produced during the drilling operation;

processing the acoustic signal to determine the source acoustic signal and the reflected acoustic signal;

determining a first signal based on the source acoustic signal;

determining, for each of a plurality of candidate sets of rock physics models, a second signal based on the reflected acoustic signal and a respective candidate set, wherein each of the rock physics models from the respective candidate set is selected from a library of rock physics models and corresponds to a respective geologic layer, the rock physics model modeling a relationship between interval velocity and density of each of one or more geologic layers in the subterranean zone;

generating, for each of the plurality of candidate sets of rock physics models, a respective synthetic signal based on a convolution of the first signal and the respective second signal;

computing, for each of the plurality of candidate sets of rock physics models, an objective misfit function based on a comparison of the respective synthetic signal and the reflected acoustic signal;

determining properties of the subterranean zone, the determined properties corresponding to an identified candidate set of rock physics models that minimizes the objective misfit function, wherein the properties of the subterranean zone comprise density of each of the one or more geologic layers in the subterranean zone; and performing lithology interpretation operations of the subterranean zone using the determined properties of the subterranean zone.

14. The computer-implemented system of claim 13, wherein the one or more operations further comprise:

providing, during the drilling operation, the determined properties of the subterranean zone for characterization of subsurface properties of lithology of the subterranean zone.

15. The computer-implemented system of claim 13, wherein the properties of the subterranean zone comprise primary wave seismic impedance of each of the one or more geologic layers in the subterranean zone.

16. The computer-implemented system of claim 13, wherein determining the properties of the subterranean zone comprises determining the properties of the subterranean zone based on the convolution of the first signal and the second signal and a minimization of a function.

17. The computer-implemented system of claim 13, wherein the convolution of the first signal and the second signal is a one dimensional convolution of the first signal and the second signal.

* * * * *